US007133850B2

(12) United States Patent
Gargiulo

(10) Patent No.: US 7,133,850 B2
(45) Date of Patent: Nov. 7, 2006

(54) POSTAGE SYSTEM HAVING TELEPHONE ANSWERING AND MESSAGE RETRIEVAL CAPABILITY

(75) Inventor: Joseph L. Gargiulo, Trumbull, CT (US)

(73) Assignee: Pitney Bowes Inc., Stamford, CT (US)

( * ) Notice: Subject to any disclaimer, the term of this patent is extended or adjusted under 35 U.S.C. 154(b) by 889 days.

(21) Appl. No.: 09/965,750

(22) Filed: Sep. 28, 2001

(65) Prior Publication Data

US 2003/0065628 A1 Apr. 3, 2003

(51) Int. Cl.
*G06F 17/00* (2006.01)

(52) U.S. Cl. .................................................... 705/402

(58) Field of Classification Search ............... 379/67.1, 379/74, 88.11, 88.13; 705/1, 408, 410
See application file for complete search history.

(56) References Cited

U.S. PATENT DOCUMENTS 3,792,446 A 2/1974 McFiggins et al.
4,097,923 A * 6/1978 Eckert et al. ............... 705/403
4,447,890 A * 5/1984 Duwel et al. ............... 705/403
4,556,944 A 12/1985 Daniels et al.
4,744,554 A 5/1988 Kulpa et al.
4,752,950 A * 6/1988 Le Carpentier ........ 379/106.11
4,817,127 A * 3/1989 Chamberlin et al. ..... 379/88.11
4,821,311 A * 4/1989 Hashimoto ............... 379/88.24
4,907,161 A 3/1990 Sansone et al.
5,310,128 A 5/1994 Doeberl et al.
5,311,573 A * 5/1994 Otsuki ....................... 379/67.1
5,337,246 A 8/1994 Carroll et al.
5,615,120 A * 3/1997 Schwartz et al. ........... 705/407
5,701,250 A 12/1997 Wilson
5,737,426 A * 4/1998 Brookner et al. ............. 380/51
5,778,348 A * 7/1998 Manduley et al. .......... 705/409
5,799,093 A * 8/1998 French et al. ................. 380/51
5,822,738 A 10/1998 Shah et al.
6,038,690 A * 3/2000 Jacobson et al. ............. 714/49
6,161,007 A 12/2000 McCutcheon et al.
6,175,820 B1 1/2001 Dietz
6,356,883 B1 * 3/2002 Katikaneni et al. ......... 705/408
6,370,521 B1 4/2002 Pigos, Jr. et al.

FOREIGN PATENT DOCUMENTS

GB 217869 A 2/1987
WO WO 00/28719 A1 * 5/2000

OTHER PUBLICATIONS

Crisp: "High-Tech Home: Leave your name and number / Answering machines", Financial Times, May 11, 1985, Section P, ED P XIV.*

* cited by examiner

*Primary Examiner*—Thomas A. Dixon
(74) *Attorney, Agent, or Firm*—Martin F. Noonan; Angelo N. Chaclas

(57) ABSTRACT

A postage system includes a data center, a population of postage metering systems and a control system that is in operative communication with the data center and the population of postage metering systems. The population of postage metering systems are located remote from the data center and are geographically distributed. The control system receives an incoming telephone call at one postage metering system of the population of postage metering system, stores a voice message associated with the telephone call and retrieves the voice message from another postage metering system of the population of postage metering systems.

16 Claims, 5 Drawing Sheets

POSTAGE SYSTEM HAVING TELEPHONE ANSWERING AND MESSAGE RETRIEVAL CAPABILITY

CROSS FRFERENCE TO RELATED APPLICATIONS

This application is related to commonly assigned, co-pending U.S. patent application Ser. No.: 09/965,753, filed on even date herewith, entitled "POSTAGE METERING SYSTEM HAVING TELEPHONE ANSWERING CAPABILITY,"in the name of Joseph L. Garagiulo.

FIELD OF THE INVENTION

The present invention relates to telephone answering machines in general and more particularly to a postage system having telephone answering and message retrieval capability.

BACKGROUND OF THE INVENTION

Postage metering systems are well known in the art. A typical postage meter stores and dispenses postage. Historically, postage meters have been mechanical and electromechanical devices that maintain through mechanical or "electronic" registers an account of all postage printed and the remaining balance of postage available for printing. Evidence that postage has been dispensed is most often in the form of a postal indicium that is printed on an envelope or other mail piece. As is well known, postage meters include an ascending register, that stores a running total of all postage dispensed by the meter, and a descending register that holds the remaining amount of postage credited to the meter. The descending register is reduced by the amount of postage dispensed during a transaction. The postage meter generally also includes a control sum register that provides a check upon the descending and ascending registers. The control sum register has a running account of the total funds having been added into the meter. The control sum register must always correspond with the summed readings of the ascending and descending registers. Thus, the control sum register is the total amount of postage ever put into the meter and it is alterable only when adding funds to the meter. In this manner, by inspecting the various registers and securing them from tampering, the dispensing of postal funds may be accurately recorded, tracked and accounted for.

It is typical of postal authorities, such as the United States Postal Service (USPS), to promulgate rules governing the placement, installation, registration and tracking of postage meters by postage meter manufacturers with customers. For example, postal funds records for each postage meter may be maintained by the regional post offices wherein the postage meters are physically located. As such, the postage meter is typically registered (licensed) to a particular user at a specified location and assigned to a regional post office corresponding to the specified location. As another example, the postage meter is typically provided with the ability to print a geographic location indicator, such as a ZIP Code, as part of the postal indicium. In the United States, this geographic location indicator is part of the "town circle" information contained with the postal indicium and corresponds to the ZIP code of the regional post office where the postage meter is installed. Generally, postal authority rules require that the mail pieces be delivered to the corresponding regional post office. Thus, if a regional post office begins to receive a large volume of mail containing an incorrect geographic location indicator, then it may be an indication that the user or manufacturer has moved the postage meter from one location to another location. This necessitates an updating of the records that are kept by the postal authority and modification of the postage metering system by the manufacturer to update the geographic origin indicator.

As is well understood in the art, postage meters will not dispense postage unless sufficient funds or authorization exists in the accounting registers described above. Thus, the postage meters eventually run out of stored postage value such that the postage meter is disabled from printing postage until additional postage value or authorization (in a post-payment system) is added to the postage meter. Remote meter resetting systems have been developed which provide the capability of having postage added to these postage meters without requiring the postage meter to be physically brought into the post office. Examples of such conventional remote postage meter resetting systems are shown in U.S. Pat. Nos. 4,447,890 and 4,097,923. Typically, remote postage meter resetting is accomplished by obtaining authorization codes from a data center via telephone which are in turn used by the postage meter to adjust the accounting registers accordingly. In older postage metering systems an operator calls the data center and manually enters the authorization codes into the postage meter. In new systems, the postage meter is placed directly into communication with the data center via modem and common telephone lines or some other suitable communication network.

To confirm compliance with various postal authority regulations like those described above, the postage metering systems must also be periodically inspected. In older postage metering systems, a customer service representative was often dispatched to the customer's location to perform the inspection. This may entail confirming that the postage metering system is at the anticipated address, inspecting the accounting register readings and reviewing the general operation and condition of the postage metering system. More recently, newer systems allow much, if not all, of this activity to be performed remotely by placing the postage meter into communication with the data center. Examples of such conventional remote inspections are shown in U.S. Pat. Nos. 5,799,093 and 6,038,690.

Another reason why postage meter manufacturers communicate remotely with postage metering systems is to effect upgrades and/or changes to the postage metering systems. Thus, downloading of new software and enabling dormant/optional features are just some of the tasks that may be executed remotely by placing the postage metering system into communication with the data center. Examples of such techniques are shown in U.S. Pat. Nos. 5,778,348 and 5,737,426. Accordingly, these techniques may be employed to update town circle information and make other changes associated with relocation of a postage meter from one facility to another facility.

Even with all of the potential uses for the remote communications described above, some customers have been reluctant to accept the increased costs associated with embedding this communication capability into the postage metering system. One reason may be that they perceive that they are paying for something that not only benefits themselves, but also largely benefits the postal authority and the meter manufacturer. As examples, the postal authority benefits by increased security and reduced costs due to the remote inspections while the manufacturer benefits by reduced costs since those instances in which a service representative must be dispatched are reduced. Another reason that some customers may be slow to accept the embedded communication capability is that it may not be frequently utilized. As examples, the customer may only need to reset the postage metering system (download postal funds) once or twice a month while inspections are conducted annually. Similarly, it is not anticipated that software upgrades would be required on a frequent basis. Therefore, the embedded communication capability remains dormant much of the time.

Similarly, since a postage metering system has traditionally been a dedicated device, its utility in the mail room or office has been limited to postage metering activities. Although the postage metering system is a computer based system that typically also incorporates digital printing (laser, ink jet, thermal transfer, or other dot matrix printing technology), the system is not based on standard components, such as: a personal computer, off the shelf operating system and software, and general purpose office printer. Thus, the proprietary nature of the postage metering system has provided no utility for the customer beyond the postage metering environment. As a result, for those customers that do not have a lot of mail volume, the postage metering system remains idle for long periods of time.

As a result of the above, in environments where customers are scrutinizing their capital expenditures and desk/office space is at a premium, the justification for obtaining a postage metering system is increasingly challenged.

Therefore, there is a need for a postage metering system that provides increased functionality for the customer while taking advantage of the already existing components of the postage metering system. In this way, the new functionality may be brought to the customer without having to conduct a substantial redesign of the postage metering system by the manufacturer or pass significant extra cost on to the customer.

SUMMARY OF THE INVENTION

The present invention increases the functionality of traditional postage metering systems without adding significantly to the cost of such systems by incorporating telephone answering capability and remote retrieval capability.

It is believed that the present invention leverages the investment that the customer has already made in the postage metering system by using the embedded systems that are already present in new ways.

In accordance with the present invention, a postage system includes a data center, a population of postage metering systems and a control system that is in operative communication with the data center and the population of postage metering systems. The population of postage metering systems are located remote from the data center and are geographically distributed. The control system receives an incoming telephone call at one postage metering system of the population of postage metering system, stores a voice message associated with the telephone call and retrieves the voice message from another postage metering system of the population of postage metering systems.

In accordance with the present invention, methods of operating a postage meter system and a data center are also provided.

Therefore, it should now be apparent that the invention substantially achieves all the above objects and advantages. Additional objects and advantages of the invention will be set forth in the description that follows, and in part will be obvious from the description, or may be learned by practice of the invention. Moreover, the objects and advantages of the invention may be realized and obtained by means of the instrumentalities and combinations particularly pointed out in the appended claims.

DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention. As shown throughout the drawings, like reference numerals designate like or corresponding parts.

DETAILED DESCRIPTION OF THE PREFERRED INVENTION

Figure 1:
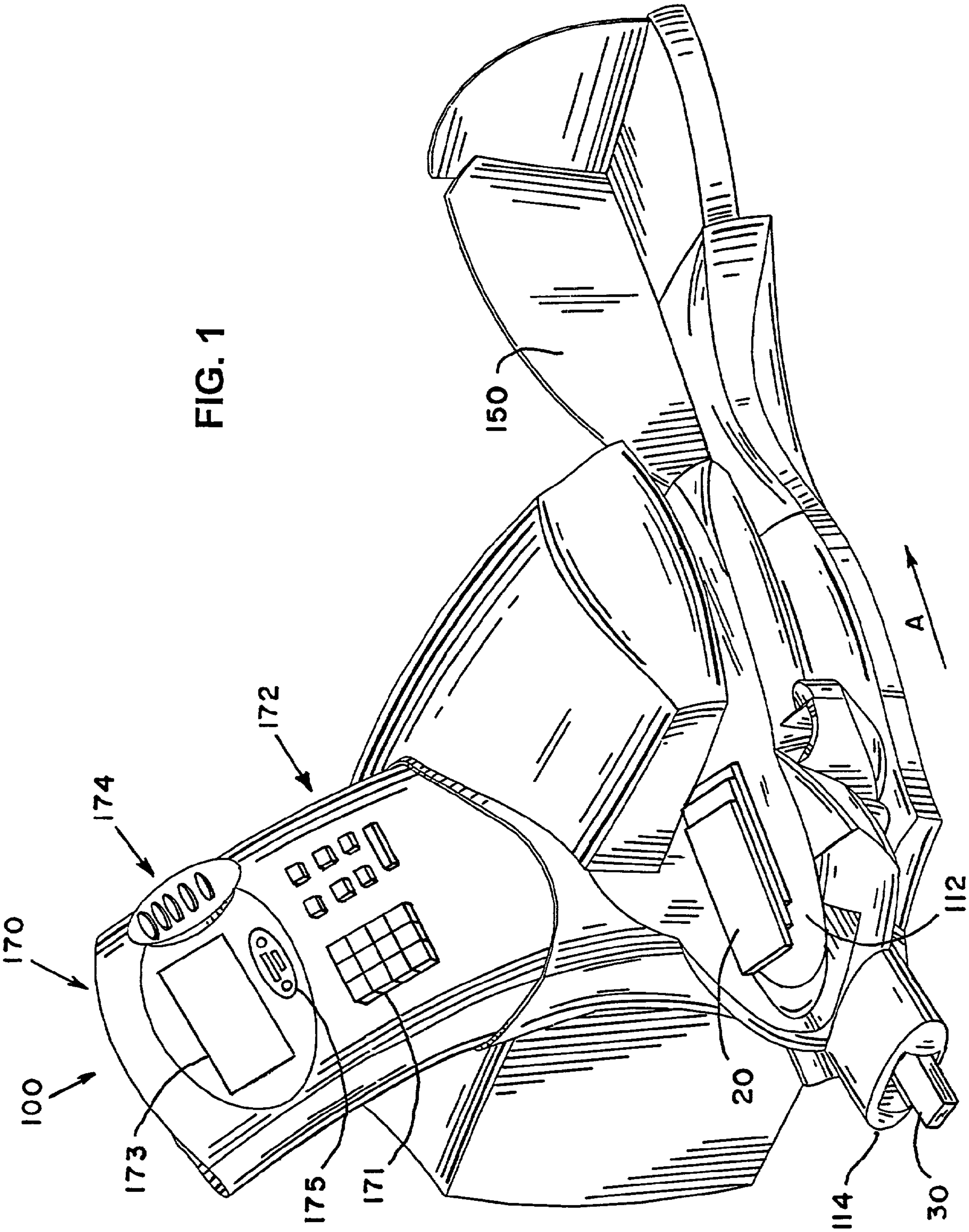
FIG. 1 is an example of a postage metering system in accordance with the present invention.

Referring to FIG. 1, a representative example of a middle volume (generally regarded as capable of processing between sixty and one hundred mail pieces per minute) postage metering system 100 is shown. The system 100 machine 100 may include a variety of different modules (not all shown) where each module performs a different task on a mailpiece, such as: singulating (separating the mailpieces one at a time from a stack of mailpieces), weighing, moistening/sealing (wetting and closing the glued flap of an envelope) and transporting the mailpiece through the various modules. However, the exact configuration of the system 100 is particular to the needs of the customer. Since the postage metering system 100 may be of any conventional architecture, such as the Personal Post™ meter, the Galaxy® mailing machine, the DM300™ digital mail processor, all available from Pitney Bowes Inc. of Stamford, Conn., United States of America, a detailed discussion of the postage metering system 100 is not necessary for an understanding of the present invention. Therefore, for the sake of brevity, the description of the system 100 shall be limited to that which facilitates an understanding of the present invention.

Figure 2:
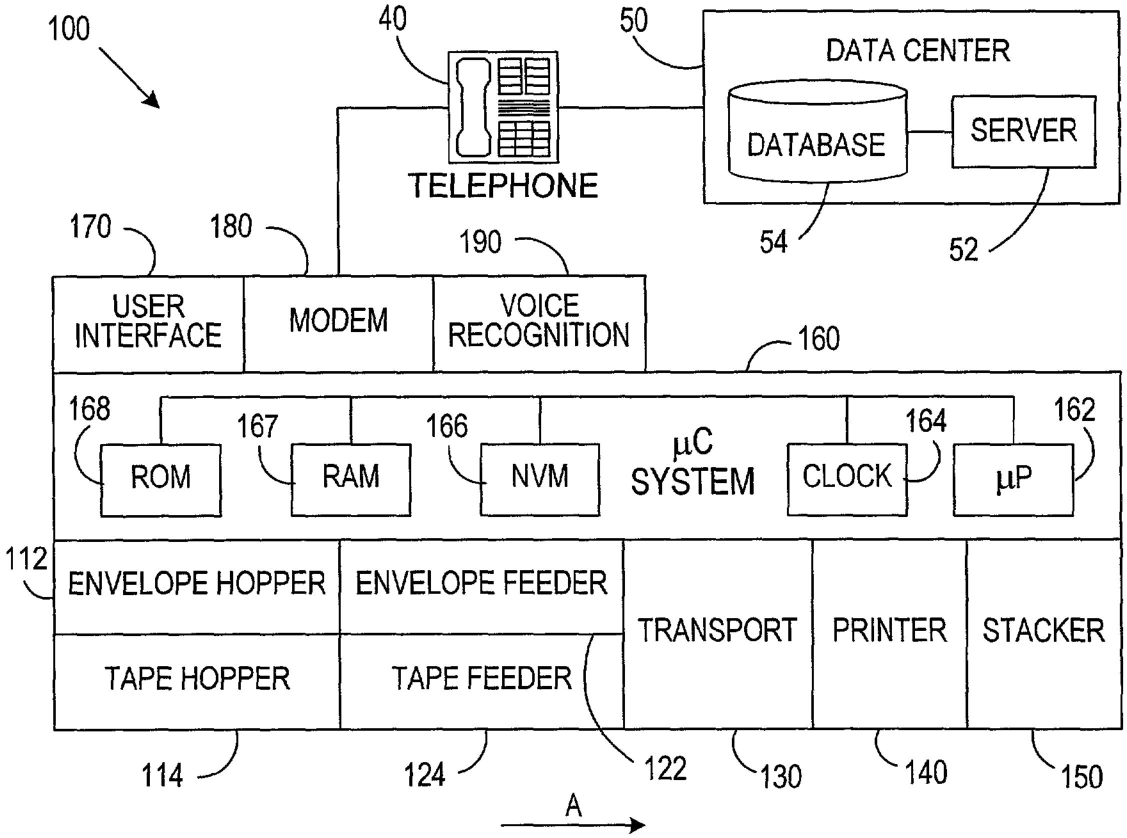
FIG. 2 is a diagrammatic representation of the postage metering system in accordance with the present invention.

Referring to FIG. 2 in view of FIG. 1, a diagrammatic representation of the postage metering system 100 is shown. The various modules of the postage metering system 100 will now be described. The postage metering system 100 includes an envelope hopper 112 of conventional design for holding a stack of envelopes (post cards or the like) 20 and an associated envelope feeder 122, also of conventional design, for feeding the envelopes 20 in seriatim (one at a time) to the transport 130. Similarly, the postage metering system 100 also includes a tape hopper 114 of conventional design for holding a stack of tapes 30 and an associated tape feeder 124, also of conventional design, for feeding the tapes 30 in seriatim (one at a time) to the transport 130. The transport 130 may be of any conventional design for feeding the envelopes 20 and tapes 30, as the case may be, downstream in a path of travel through the postage metering system 100 as indicated by arrow A. Generally, the envelope 20 and tape 30 may be referred to as a mail piece or recording medium. Proximate to the path of travel and downstream in the path of travel from the envelope feeder 122 and the tape feeder 124 is a printer 140 for printing a postal indicium (not shown) or other information on the mail piece. Generally, the printer 140 may be of any suitable design employing dot matrix (digital) printing technology, such as: thermal transfer, thermal direct, ink jet, wire impact, electrophotographic or the like. Once the printing operation has been completed, the mail piece continues downstream in the path of travel until it is collected in a stacker 150 for retrieval by the operator.

The postage metering system 100 further includes a control system 160, user interface 170, a modem 180 and a voice recognition module 190. The user interface 170 is for communicating messages (information, commands, instructions or the like) to the operator from the control system 160 and vice versa. The user interface 170 includes a numeric keypad 171, a set of function keys 172, a display 173 (CRT, LED, LCD, or otherwise), a set of menu keys 174 and a speaker/microphone 175. The function keys 172 are aligned with a portion of the display 173 so as to facilitate the selection of various menus and options by the operator. These keys 172 provide access to a set of "soft" commands or functions, such as: enter, clear, download postage, generate report, account setup, diagnostics and the like. By soft commands, it is meant that these commands are not directly related to processing a batch of mailpieces. The menu keys 174 provide access to a set of "hard" commands, such as: start, stop, print tape, reset batch counter, weigh mode on/off, sealer/moistener mode on/off and the like, which are directly related to processing a batch of mailpieces. The speaker/microphone 175 allows for the audio exchange of messages between the control system 160 and the operator. The modem 180 provides for direct communication between the postage metering system 100 and a common telephone network 40. In this way, the postage metering system 100 may be placed into direct communication with a data center 50 or other entity having access to the telephone network 40. The voice recognition module 190 may be of any conventional design that is commercially available, such as those from Dragon Systems, Inc., Lernout & Hauspie Speech Products N.V. or International Business Machines of Armonk, N.Y., USA, for recognizing verbal dialog (speech) and translating it into computer based text format (ascii, rich text format, or other suitable format).

Generally, the control system 160 is for overseeing the operation of the postage metering system 100 and may be of any conventional design employing a suitable combination of software and hardware components. In the most preferred embodiment, the control system 160 includes a suitable processor 162 in operative communication with a clock module 164, a non-volatile memory (NVM) 166, a random access memory (RAM) 167 and a read only memory (ROM) 168 over suitable communication lines, such as an internal bus. In conventional fashion, the processor 162 provides computing resources, the clock 162 provides real time clock data, the RAM 167 serves as the primary workspace for the processor 162 while the ROM 168 stores control routines (BIOS, operating software, telephone answering software, postage meter operational software and the like) for use by the processor 162. Although the ROM 168 is also non-volatile, it is not updateable by the processor 162. Therefore, the processor 162 does not write to the ROM 168, but instead uses the NVM 166.

Figure 2A:
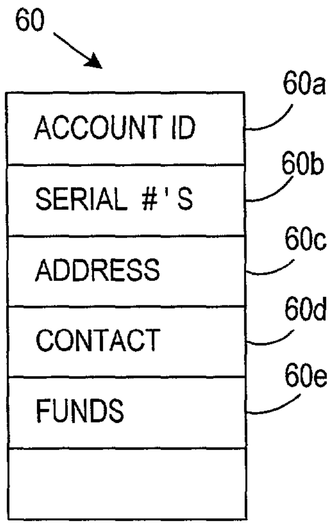
FIG. 2A is a diagrammatic representation of a customer account file maintained by a data center in operative communication with the postage metering system in accordance with the present invention.

Although the data center 50 may be operated by the postal authority itself, the remainder of the description will focus on an implementation where the data center 50 is operated by a postage meter manufacture, or other authorized agency. Generally, the data center 50 communicates periodically with the postage metering system 100 for the various reasons (recharge, inspection, upgrade, etc.) described in detail above. Additionally, the data center 50 and the postage metering system 100 may communicate with each other for additional reasons discussed in detail below. Referring to FIG. 2A, in view of FIGS. 1 and 2, the data center 50 includes a central computer server 52 and a database 54 in operative communication with each other. The computer server 52 may be of any conventional combination of computer hardware and software sufficient to execute the functionality summarily described above and described in greater detail below. The database 54 may be of any conventional permanent storage technology (magnetic tape, magnetic disk, optical disk, etc.) for the purpose of maintaining account and other information associated with the postage metering system 100. Generally, for each postage metering system 100, the database 54 will include a respective customer account file 60 that includes various information, such as: an account identifier (numeric, alpha-numeric, etc.) 60*a*, a list of postage meter serial numbers (one or more) 60*b* associated with the account identifier 60*a* (a single customer may have one or more postage meters), a customer address 60*c* (street/town/state, etc.), other customer contact information 60*d* (operator and customer names, telephone numbers, e-mail addresses, PIN, etc.) and funds accounting information 60*e*. In some instances, the account identifier 60*a* and the postage meter serial number 60*b* may be the same. The postage meter serial number 60*b* corresponds to the meter serial number (not shown) that is printed in a postal indicium (not shown) on a mail piece, such as a tape 30 or envelope 20. The customer address 60*c* corresponds to the location where the postage metering system 100 has been licensed for use. The accounting information 60*e* includes meter register (ascending, descending, etc.) data and reset activity data including a reset dates and reset amounts associated with postage recharge (download) operations.

Figure 5:
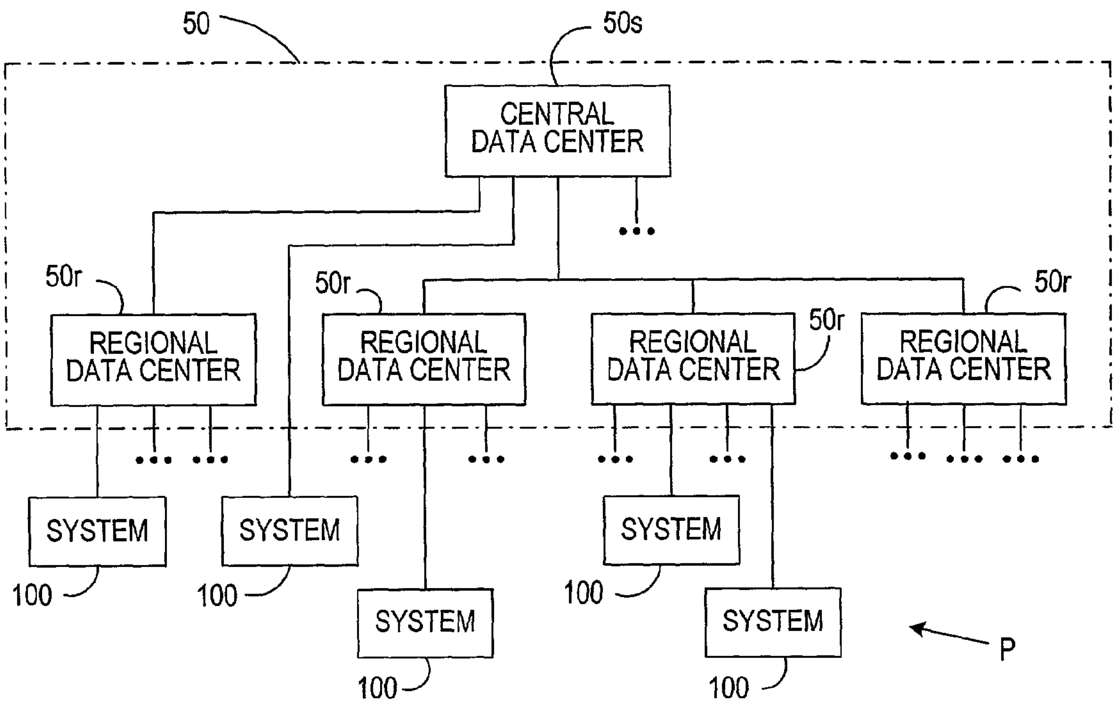
FIG. 5 is a schematic representation schematic representation of a population of postage metering systems connected to the data center in accordance with the present invention.

Referring to FIG. 5 in view of FIGS. 1 and 2, a schematic representation of a population P of postage metering systems 100 connected to the data center 50 is shown. Generally, the data center 50 may be made up of a central data center 50*s*, a network of regional data centers 50*r* or a suitable combination of both central data center 50*s* and regional data centers 50*r*. It is fully contemplated that the central data center 50*s* and regional data centers 50*r* would be networked so that data could be exchanged between themselves. In this way, load balancing at the various data centers 50*s* and 50*r* could be managed by redirecting communications with the population P of postage metering systems 100 across the central data center 50*s* and regional data centers 50*r*. Most preferably, as shown in FIG. 5, the data center 50 includes the single central data center 50*s* in combination with various regional data centers 50*r* that are geographically dispersed to address various issues, such as: customer service and telecommunication costs. Depending upon its location and connection capabilities, each postage metering system 100 may connect to the data center 50 in different ways. Examples shown are: the postage metering system 100 connecting to a regional data center 50*r* and the postage metering system 100 connecting to the central data center 50*s*.

By way of introduction, with the postage metering system 100 described as above, it can now be seen that adding telephone answering software and voice recognition capability (most preferably software only) extends the functionality of a traditional postage meter while not adding significant cost. This is largely because the addition of software is primarily a sunk cost and the embedded systems of the postage metering system 100, such as the processor 162, modem 180 and user interface 170, are taken advantage of and reused for telephone answering. Furthermore, the recording medium feeding and printing capabilities of the postage metering system 100, as well as the networked arrangement of the population of postage metering systems 100 to the data center 50, may be further leveraged to offer extra features associated with telephone answering. A more detailed discussion is provided below.

Figure 2B:
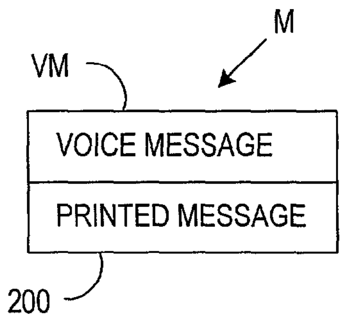
FIG. 2B is a schematic representation of a message having a voice component and a printed component in accordance with the present invention.

Referring to FIG. 2B, in view of FIGS. 1 and 2, a schematic diagram of a message M is shown. Generally, the message M includes a voice component or a voice message VM and a printed component or print message 200 that is derived from the voice message VM. How the postage metering system 100 receives the voice message VM and prints the print message 200 will be described below.

Figure 3:
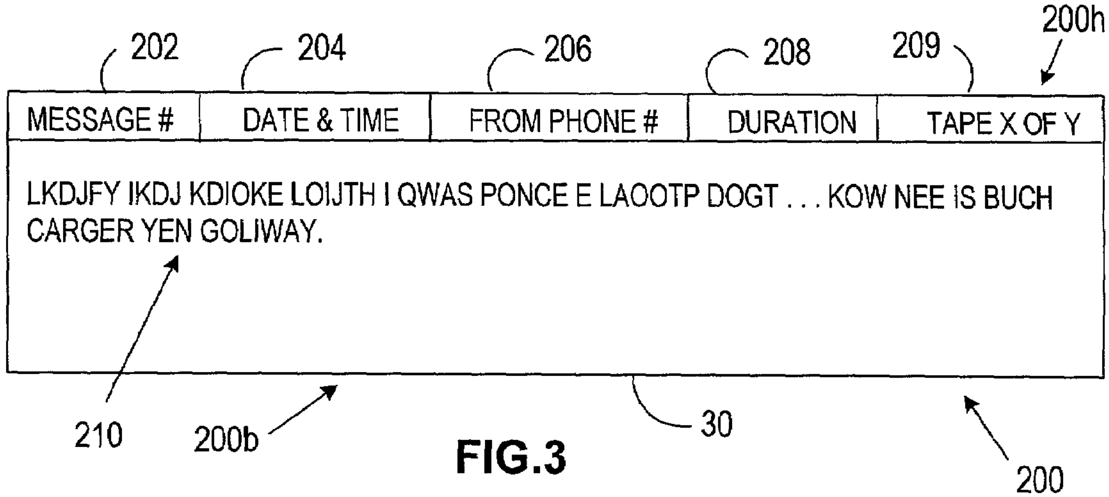
FIG. 3 is an example format for a message printed on a tape by the postage metering system in accordance with the present invention.
Figure 3A:
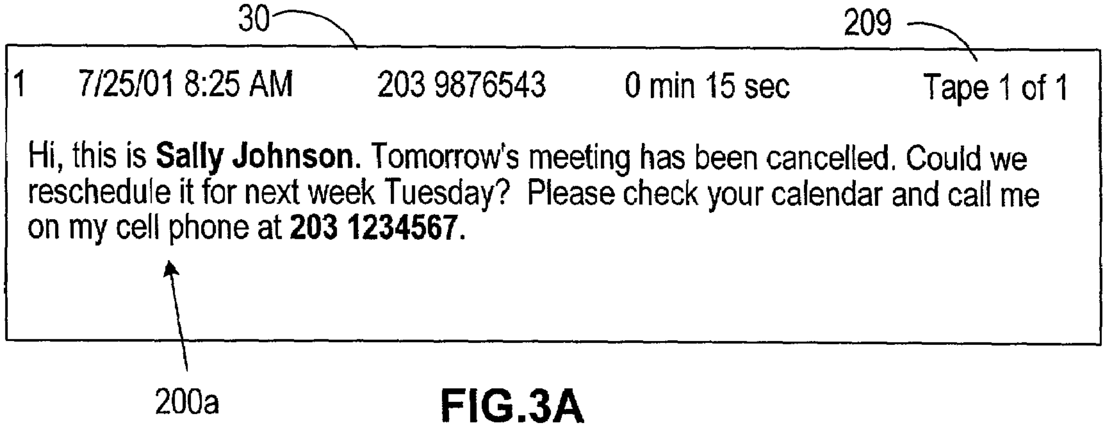
FIGS. 3A, 3B, 3C and 3D show a sequence of illustrative messages printed by metering system in accordance with the present invention.
Figure 3B:
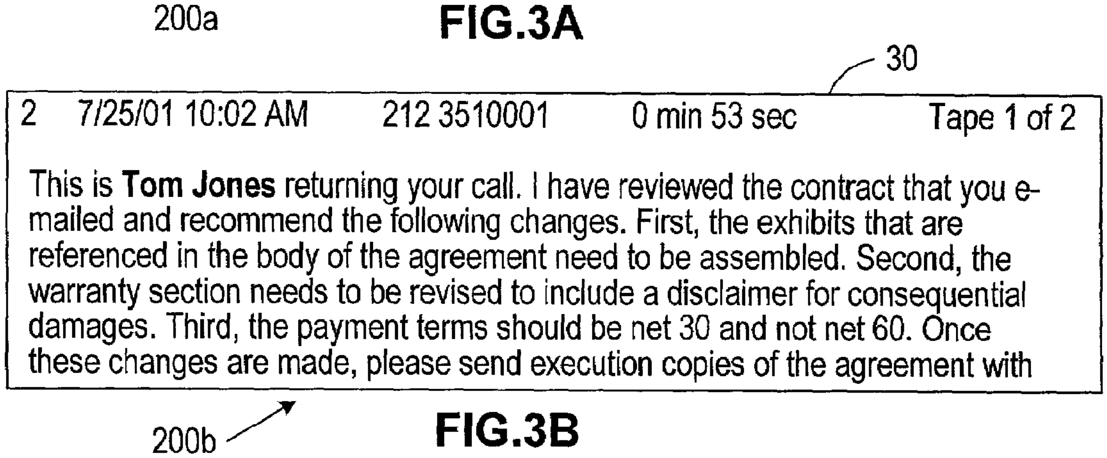
Figure 3C:
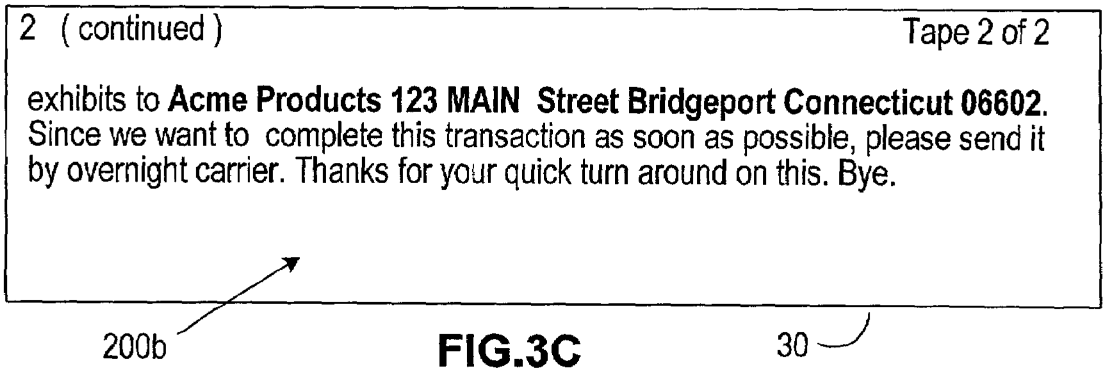
Figure 3D:
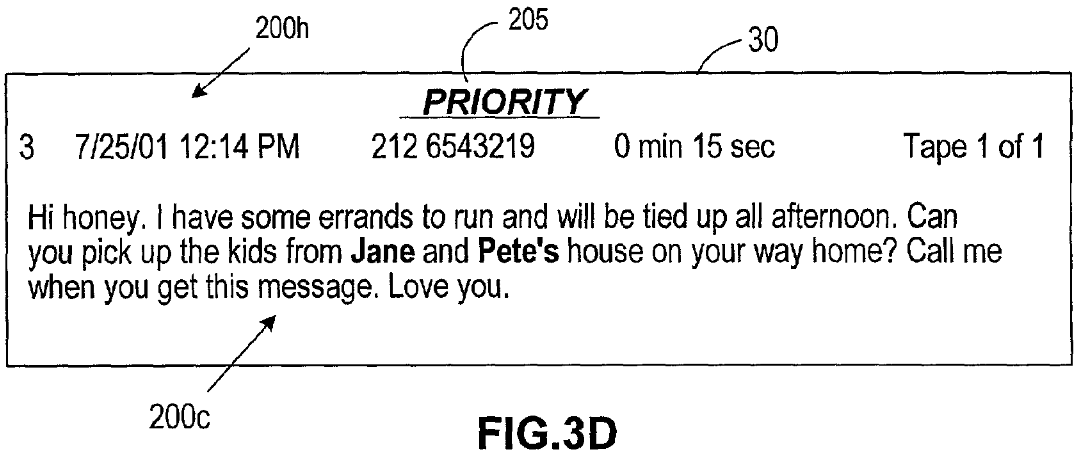

Referring to FIG. 3, in view of FIGS. 1, 2 and 2B, an example format for a print message 200 printed on a tape 30 by the postage metering system 100 is shown. The print message 200 includes a message header 200*h* and a message body 200*b*. Generally, the message header 200*h* is arranged along a top edge of the tape 30 when the tape 30 is view in landscape, while the message body 200*b* appears below the message header 200*h*. The message header 200*h* includes a sequential message number (numeric, alpha, alphanumeric or the like) or other identifier 202, a data/time stamp 204, a listing of the originating telephone number 206, an indication of the duration 208 of the print message 200 and an indication 209 of the number of tapes 30 required to print the print message 200. The message body 200*b* includes a text based message 210 corresponding to a voice message received by the postage metering system 100.

Referring to FIGS. 3A–3D, in view of FIGS. 1, 2, 2B and 3, several sample illustrative print messages 200*a*–200*c*, respectively, are shown. The first message 200*a* is wholly printed on a single tape 30 as indicated by the number of tapes indicator 209 which says "Tape 1 of 1". The second message 200*b* spans across two tapes 30 (see FIGS. 3B and 3C). The third message 200*c* includes a special treatment indicator 205, which in this case is the phrase "PRIORITY" appearing within the header 200*h*. A review of the print messages 200*a*–200*c* shows that some information may optionally be printed in bold type. This is achieved by parsing the message data prior to printing and giving special print characteristics (bold, italics, different size, different font, repeated in more readily discernable location, etc.) to critical data meeting previously defined parameters set by the operator. Thus, most preferably the operator may specify the what types of critical data (names, numbers, address or the like) are to receive what types of special print characteristics. As examples, the postage metering system 100 has been set to parse the message data to locate and highlight names, numbers and addresses that may be embedded within the message body 200*b* by printing them in bold. As an alternative or in addition, the names, numbers and/or addresses could be repeated in the header 200*h*, or at the bottom of the tape 30 or in any another designated area of the print message 200 so as to make them more readily locatable. In this way, the operator may more easily focus on these elements of the print message 200.

Figure 4:
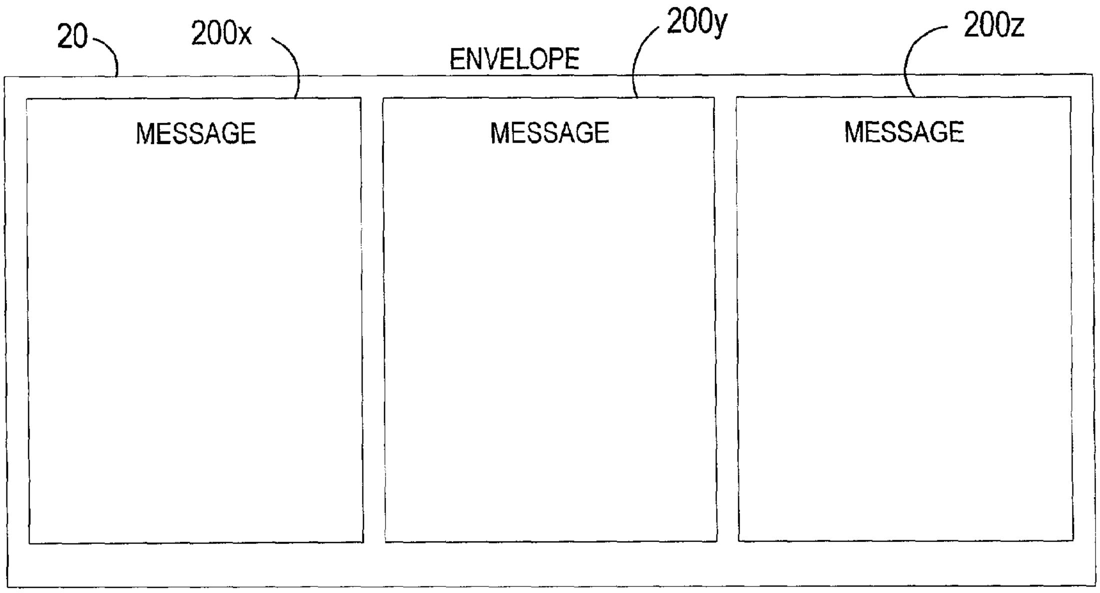
FIG. 4 is a schematic representation of a plurality of messages printed on an envelope by the postage metering system in accordance with the present invention.

Referring to FIG. 4, in view of FIGS. 1, 2, 2A, 2B, 3 and 3A–3D, a schematic representation of a plurality of print messages 200*x*, 200*y* and 200*z* printed on an envelope 20 are shown. This is an alternative to printing on the tapes 30 as described above. Therefore, those skilled in the art will appreciate that the operator may have the option to print either on a tape 30 or an envelope 20 for those postage metering systems 100 that have tape feeding and printing capability. The envelope 20 may be of any conventional type, such as a standard no. 10 envelope. The plurality of print messages 200*x*, 200*y* and 200*z* are consistent with those other print messages 200*a*, 200*b* and 200*c* described above. However, they may be reformatted to fit more conveniently on the envelope 20. As is now readily apparent, due to the increased size of the envelope 20 over the tape 30, the potential exists for more than one print message 200 to fit on the envelope 20 depending upon the respective size of the print messages 200. Also, those skilled in the art will recognize that the messages 200*x*, 200*y* and 200*z* may be oriented to be viewed when the envelope 20 is held in portrait orientation.

Figure 6:
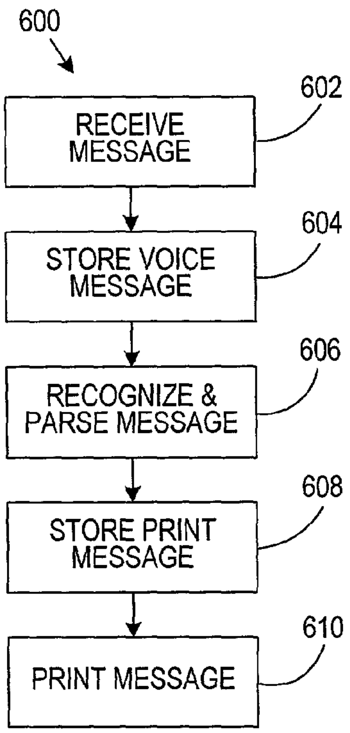
FIG. 6 is a flow chart of a message receipt/print routine executed by the postage metering system in accordance with the present invention.

With the structure of the present invention described as above, the operational characteristics will now be described with respect to receiving the voice message VM and printing of the print message 200 by the postage metering system 100. Referring primarily to FIG. 6 while referencing the structure of FIGS. 1, 2, 2A, 2B, 3, 3A–3D, 4 and 5, a flow chart of a message receipt/print routine 600 as executed by the postage metering system 100 in accordance with the present invention is shown. For the sake of clarity, it is assumed that the operator has enabled the telephone answering capability so that the postage metering system 100 answers an incoming phone call in the event that the incoming call has not been answered by a person within a predetermined number of rings.

At 602, the postage metering system 100 receives an incoming telephone call by conducting a sequence of events, such as: waiting a predetermined number of rings, answering the incoming telephone call, playing back a previously recorded salutation (outgoing message) and providing a response period during which the caller may leave the voice message VM. Generally, this may be accomplished by the control system 160 in combination with the modem 180. Next, at 604, the postage metering system 100 stores the voice message VM in the NVM 166 by digitally sampling the analog signals corresponding to the caller's voice that are received by the modem 180. Using the clock module 164 and appropriate software, the postage metering system 100 associates other information relating to and contained within the header 200*h* with the voice message VM. Next, at 606, the postage metering system 100 recognizes (translates) the voice message VM and parses the resultant computer based text to generate the print message 200. Using the voice recognition module 190, the caller's verbal dialog (speech) is translated into computer based text format which in turn is parsed to provide special print characteristics to portions of the voice message VM meeting previously defined parameters. Both the types of special print characteristics and the defined parameters are most preferably settable and modifiable by the operator. Next, at 608, the translated and parsed version of the voice message VM along with the various header information 200*h* is stored in the NVM 166 as the print message 200. Those skilled in the art will recognize that the postage metering system 100 maintains an association between each voice message VM and its respective print message 200. Optionally, those skilled in the art will recognize that this step may be automatically conducted at the voice message VM is being received, at a latter predetermined time as specified by the operator or at the request of the operator. Furthermore, the parsing may occur as the voice recognition translation is occurring or after the voice recognition has completed. Next, at 610, the postage metering system 100 prints the print message 200. Generally, this is most preferably conducted depending upon previously established parameters that have been set by the operator. As examples, the printing may: (i) occur on a tape 30, an envelope 20 or other suitable recording medium; (ii) automatically in response to receipt of a voice message VM; (iii) in response to a request from the operator via the user interface 170; (iv) after the collection of a predetermined number of voice messages VM; (v) automatically print "priority" messages only; and (vi) print "priority" messages in a predetermined sequence with respect to other messages (i.e. print first so that they are available sooner or print last so that they are on top of a stack of printed messages). Those skilled in the art will now appreciate that many other suitably desirable parameters may be used to control the printing of print messages 200.

Figure 7:
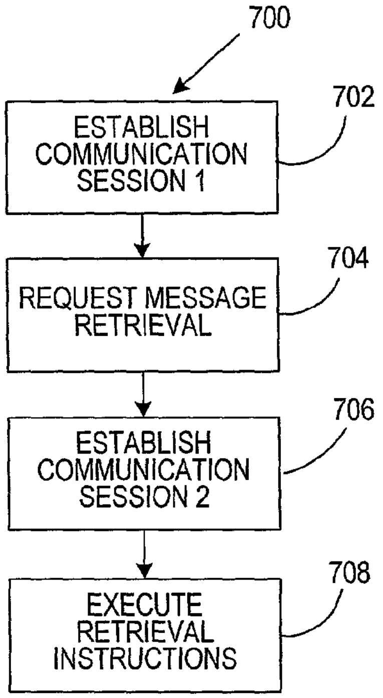
FIG. 7 is a flow chart of a message retrieval routine executed by a plurality of postage metering systems in combination with the data center in accordance with the present invention.

Referring primarily to FIG. 7, while referencing the structure of FIGS. 1, 2, 2A, 2B, 3, 3A–3D, 4 and 5 and in view of FIG. 6, a flow chart of a message retrieval routine 700 as executed by the postage system (the combination of the population P of postage metering systems 100 with the data center 50) in accordance with the present invention is shown. For the sake of clarity, it is assumed that a voice message VM has already been received at one postage metering system 100 in accordance with the message receipt/print routine 600 described above and is to be retrieved at another postage metering system 100.

At 702, an operator establishes a communication session with the data center 50 using a first postage metering system 100 that is located remotely from the data center 50. Generally, this may be achieved by entry of suitable account information 60 via the user interface 170, where the account information 60 corresponds to a second postage metering system 100 that is located remotely from both the data center 50 and the first postage metering system 100. Most preferably, this involves the entry of a valid account ID 60*a* and corresponding personal identification number (PIN). As mentioned above, the second postage metering system 100 has stored therein a voice message VM. Next, at 704, the operator requests message retrieval from the second postage metering system 100 by entry of suitable menu selections or commands via the user interface 170 of the first postage metering system 100. Message retrieval is in contrast to other activities, such as: account status inquiries and postal funds transactions. Thus, since the account information 60 entered at the first postage metering system 100 corresponds to the second postage metering system 100, it is assumed by the data center 50 that the operator has authority to retrieve the voice message VM and/or the print message 200 stored at the second postage metering system 100 even though the operator is not physically present at the second postage metering system 100. Next, at 706, the data center 50 establishes a communication session with the second postage metering system 100. This is achieved by having the data center 50 access the account information 60 of the second postage metering system 100 and use it to call the second postage metering system 100. Thus, the data center 50 operates as a communication bridge between the first and second postage metering systems 100. Next, at 708, the message retrieval instructions issued by the operator are executed. For example, voice messages VM stored at the second postage metering system 100 may be played back at the first postage metering system 100. As another example, print messages 200 generated by the second postage metering system 100 may be printed at the first postage metering system 100. This may be achieved by having the operator control the second postage metering system 100 via the first postage metering system 100 or through suitable electronic data interchange (EDI) first between the second postage metering system 100 and the data center 50 and subsequently between the data center 50 and the first postage metering system 100, or some other suitable technique.

As an alternative, the data center 50 need not be in simultaneous communication with both the first and the second postage metering systems 100. Generally, this may be achieved by having the second postage metering system 100 upload voice messages VM and/or print messages 200 to the data center 50. This may occur at any predetermined instances (intervals, such as: automatically after each message, one time per day; and/or in response to any predetermine event, such as: after a given number of messages, for priority messages, system start up, system power down) where the instances (upload preferences) are most preferably established by the operator. Thus, the voice messages VM and/or print messages 200 are already resident at the data center 50 if the operator calls in. This eliminates the need to contact the second postage metering system 100 when it may be unavailable due to power off, mail processing activities or other conditions (resets, inspections, upgrades, etc.).

As another alternative, the second postage metering system 100 may only store the voice message VM and upload it to the data center 50. In turn, the data center 50 could translate and parse all of the voice messages VM received in batch mode at a predetermined time, in response to a request from the operator at the first postage metering system 100 or at some other predetermined instance.

Whether the data center 50 contacts the second postage metering system 100 or vice versa, it is preferable that the communications are secured. In this way, the integrity of the overall system cannot be compromised. In this manner, a system of mutual authentication where the data center 50 identifies itself as an authentic data center to the second postage metering system 100 and vice versa, should optionally be employed.

Those skilled in the art will now recognize that the present invention substantially addresses many of the drawbacks and deficiencies discussed above. By adding telephone answering and message retrieval capabilities to a postage metering system 100, the functionality is greatly increased without the addition of significant cost. Furthermore, since in many countries there is a large population P (over 1.5 million postage meters in the United States) of postage metering systems 100 with connections to the data center 50, the population P represents a well established network of remotely located terminals from which to retrieve messages when out of your office. Thus, the need for access to a telephone is reduced. This may even provide an incentive for various service based organizations (copy centers, mail centers, professional offices and businesses, etc.) to allow the use of their postage metering system 100 to their customers so that their customers may check messages while out of their own offices.

Furthermore, those skilled in the art will now recognize that the present invention has many advantages over traditional telephone answering systems that are not specific to their implementation in a postage metering system 100. First, the ability to print messages reducing note taking that is typically associated with audio only playback of messages. Second, printed messages convey information more quickly to the operator. Humans can skim a printed sheet for the primary information that they require of a message, namely a contact name and a phone number, more quickly than using the playback features (fast forward, skip, rewind, etc.) of an answering system. Third, the parsing and special printing associated with critical information further enhances the speed at which the operator assimilates the primary information. This addresses a typical problem with voice mail messages where people often provide their phone numbers at the end of their voice message.

Those skilled in the art will recognize that various modifications can be made without departing from the spirit of the present invention. For example, some postage metering systems 100 have roll tape capability in addition to the more conventional adhesive tapes 30 discussed above. In this case, an additional printing option exists. On the other side of the product line, some postage metering systems 100 do not have any automatic feed capability. In these systems, tapes 30 and envelopes 20 are hand fed. Thus, printing would occur at the request of the operator and after suitable recording media has been fed into the postage metering system 100. As another example, in some postage metering systems 100 the tape print path and the envelope print path are not coincident. Thus, adjustments in the printer module 140 may be required when printing on different print media. Also, those skilled in the art will recognize that the postage metering system 100 could be configured to print on general purpose office paper stock instead of or as well as tapes 30 and envelopes 20. However, those skilled in the art will appreciate that the present invention is not limited to the particular details of the postage metering system architecture. As yet another example, those skilled in the art will recognize that many of the steps and activities described above with respect to the routines 600 and 700 may be performed in differing orders or even concurrently. As yet still another example, the control of the various steps and activities described above may be shared or moved between the various modules of the postage metering system 100 and even between the postage metering system 100 and the data center 50. As an example, the voice recognition system 190 may be part of or construed to be a part of the control system 160.

Therefore, the inventive concept in its broader aspects is not limited to the specific details of the preferred embodiments but is defined by the appended claims and their equivalents.

What is claimed is:

1. A method of operating a data center for processing messages, the method comprising the step(s) of:

receiving a message associated with an incoming telephone call, the message accepted by one postage metering system of a population of postage metering systems, the population being remotely located and geographically distributed from the data center;

receiving a request from another postage metering system of the population of postage metering systems to retrieve the message; and transmitting the message to the another postage metering system.

2. The method of claim 1, further comprising the step(s) of:

translating the message into a computer based text; and generating a print message from the computer based text using the another postage metering system.

3. The method of claim 2, further comprising the step(s) of:

parsing the computer based text to create special print characteristics within the print message to highlight critical data in response to a previously established parsing parameter set by an operator of the one postage metering system.

4. The method of claim 3, wherein:

the previously established parsing parameter includes names as critical data and bold printing as the special print characteristic.

5. A method of operating a postage system for receiving and retrieving a message, the method comprising the step(s) of:

distributing a population of postage metering systems that are in operative communication with a data center, the population of postage metering systems being located remote from and in operative communication with the data center;

receiving an incoming telephone call at one postage metering system of the population of postage metering systems;

storing a voice message associated with the telephone call; and retrieving the voice message from another postage metering system of the population of postage metering systems.

6. The method of claim 5, further comprising the step(s) of:

translating the voice message into a computer based text; and printing a print message from the computer based text using the another postage metering system.

7. The method of claim 6, further comprising the step(s) of:

parsing the computer based text to create special print characteristics within the print message to highlight critical data in response to a previously established parsing parameter set by an operator of the one postage metering system.

8. The method of claim 7, wherein:

the previously established parsing parameter includes names as critical data and bold printing as the special print characteristic.

9. The method of claim 5, further comprising the step(s) of:

storing the voice message on the one postage metering system; and uploading the voice message to the data center in accordance with upload preference data previously established by an operator of the one postage metering system.

10. The method of claim 8, further comprising the step(s) of:

storing the computer based text on the one postage metering system; and uploading the computer based text to the data center in accordance with upload preference data previously established by an operator of the one postage metering system.

11. A postage system for dispensing postage, receiving messages and retrieving messages, the system comprising:

a data center;

a population of postage metering systems that are in operative communication with the data center, the population of postage metering systems being located remote from the data center and geographically distributed; and a control system in operative communication with the data center and the population, the control system for;

receiving an incoming telephone call at one postage metering system of the population of postage metering systems;

storing a voice message associated with the telephone call; and retrieving the voice message from another postage metering system of the population of postage metering systems.

12. The postage system of claim 11, wherein:

the control system is further for:

translating the voice message into a computer based text; and printing a print message from the computer based text using the another postage metering system.

13. The postage system of claim 12, wherein:

the control system is further for: parsing the computer based text to create special print characteristics within the print message to highlight critical data in response to a previously established parsing parameter set by an operator of the one postage metering system.

14. The postage system of claim 13, wherein:

the previously established parsing parameter includes names as critical data and bold printing as the special print characteristic.

15. The postage system of claim 11, wherein:

the control system is further for:

storing the voice message on the one postage metering system; and uploading the voice message to the data center in accordance with upload preference data previously established by an operator of the one postage metering system.

16. The postage system of claim 14, wherein:

the control system is further for:

storing the computer based text on the one postage metering system; and uploading the computer based text to the data center in accordance with upload preference data previously established by the operator of the one postage metering system.

* * * * *